(12) United States Patent
Venkatesan et al.

(10) Patent No.: US 7,933,404 B2
(45) Date of Patent: Apr. 26, 2011

(54) PRIMITIVES FOR FAST SECURE HASH FUNCTIONS AND STREAM CIPHERS

(75) Inventors: Ramarathnam Venkatesan, Redmond, WA (US); Matthew Cary, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 523 days.

(21) Appl. No.: 11/873,339

(22) Filed: Oct. 16, 2007

(65) Prior Publication Data

US 2009/0022308 A1 Jan. 22, 2009

Related U.S. Application Data

(62) Division of application No. 10/775,485, filed on Feb. 9, 2004, now Pat. No. 7,289,629.

(51) Int. Cl.
   *H04L 9/06* (2006.01)
   *H04K 1/00* (2006.01)
   *G06F 7/38* (2006.01)
   *G06F 7/52* (2006.01)

(52) U.S. Cl. ............. 380/28; 380/37; 380/42; 708/514; 708/607

(58) Field of Classification Search ........................ None
   See application file for complete search history.

(56) References Cited

U.S. PATENT DOCUMENTS

| | | | |
|---|---|---|---|
| 4,316,055 A | | 2/1982 | Feistel |
| 5,058,137 A | * | 10/1991 | Shah .............................. 375/340 |
| 6,069,954 A | | 5/2000 | Moreau |
| 6,928,602 B2 | | 8/2005 | Yamagishi et al. |
| 7,421,076 B2 | * | 9/2008 | Stein et al. ...................... 380/42 |
| 2002/0101986 A1 | * | 8/2002 | Roelse ............................ 380/42 |
| 2003/0152219 A1 | | 8/2003 | Coppersmith et al. |

OTHER PUBLICATIONS

Robert L. Cannon, An algebraic Technique for Context-Sensitive Parsing, 1976, Plenum Publishing Corporation, International Journal of Computer and InformationSciences, vol. 5, No. 3, pp. 257-276.*

Louis Solomon, The Bruhat Decomposition, TITS System and Iwahori Ring for the Monoid of Matrices over Finite Field, 1990, Kluwer Academic Publishers, Geometriae Dedicata 36: 15-49.*

Rosen, "Discrete Mathmatics and Its Applications", American Telephone and Telegraph Company USA, 1991, pp. 17.

Tillich et al., "Group-theoretic hash functions", Crypto, ENST, 1994, pp. 90-110.

Tillich et al., "Hashing with SL2", Algebraic Coding, Ecole Nationale Superieure des Telecommunications Network Department, 1993, pp. 40-49.

Zemor, Gilles, "Hash Functions and Cayley Graphs", Designs, Codes and Cryptography, vol. 4, 1994, pp. 381-394.

* cited by examiner

*Primary Examiner* — Nasser Moazzami
*Assistant Examiner* — Fatoumata Traore
(74) *Attorney, Agent, or Firm* — Lee & Hayes, PLLC (57) ABSTRACT

Techniques are disclosed to enable efficient implementation of secure hash functions and/or stream ciphers. More specifically, a family of graphs is described that has relatively large girth, large claw, and/or rapid mixing properties. The graphs are suitable for construction of cryptographic primitives such as collision resistant hash functions and stream ciphers, which allow efficient software implementation.

17 Claims, 6 Drawing Sheets

$$\sigma_1 = \begin{pmatrix} 3 & 1 & 0 \\ 2 & 1 & 0 \\ 0 & 0 & 1 \end{pmatrix}, \sigma_2 = \begin{pmatrix} 1 & 1 & 0 \\ 2 & 3 & 0 \\ 0 & 0 & 1 \end{pmatrix}, \sigma_3 = \begin{pmatrix} 3 & 1 & 1 \\ 2 & 1 & 1 \\ 0 & 0 & 1 \end{pmatrix}, \sigma_4 = \begin{pmatrix} 1 & 1 & 1 \\ 2 & 3 & 2 \\ 0 & 0 & 1 \end{pmatrix}$$

$$\sigma_5 = \begin{pmatrix} 1 & 2 & 0 \\ 1 & 3 & 0 \\ 0 & 0 & 1 \end{pmatrix}, \sigma_6 = \begin{pmatrix} 3 & 2 & 1 \\ 1 & 1 & 0 \\ 0 & 0 & 1 \end{pmatrix}, \sigma_7 = \begin{pmatrix} 1 & 2 & 1 \\ 1 & 3 & 1 \\ 0 & 0 & 1 \end{pmatrix}, \sigma_8 = \begin{pmatrix} 3 & 2 & 2 \\ 1 & 1 & 1 \\ 0 & 0 & 1 \end{pmatrix}$$

PRIMITIVES FOR FAST SECURE HASH FUNCTIONS AND STREAM CIPHERS

RELATED APPLICATIONS

This application is a divisional of and claims priority to U.S. patent application Ser. No. 10/775,485, filed Feb. 9, 2004 now U.S. Pat. No. 7,289,629.

TECHNICAL FIELD

The present invention generally relates to cryptology, and more particularly, to utilizing primitives for secure hash functions and/or stream ciphers.

BACKGROUND

As digital communication becomes more commonplace, the need for securing the communication channels becomes increasingly more important. For example, current technologies allow a user to remotely access bank accounts, medical information, and other private and sensitive data.

Cryptology has been widely used to provide secure digital communication. Cryptology relates to the enciphering (or encrypting) and deciphering (decrypting) of messages. The encryption and decryption generally uses some secret information (such as a key) for processing the data to be secured. In different encryption methods, a single key or multiple keys may be used for encryption and/or decryption.

Currently, two types of symmetric cipher are in common use. Generally, the encryption is said to be symmetric-key if for each associated encryption/decryption key pair, it is computationally "easy" to determine each of the keys in the key pair from the other key in the key pair. The first type of symmetric cipher is a block cipher which operates on a large block of data. The second type is a stream cipher which, by contrast, operates on relatively smaller units of text (such as bits). Depending on its implementation, stream cipher is believed to be much faster than block cipher and, hence, of special interest.

Additionally, stream ciphers can generate streams (also known as a "keystreams") while approaching the high security of one-time pad. Generally, one-time pad cipher generates a keystream with the same length as the text message being encrypted. The one-time pad keystream is believed to be completely random, yielding very high security levels.

One of the most widely used stream cipher techniques is the alleged RC4 (Ron's Code 4—variable-key-size encryption algorithm by Ron Rivest of RSA (Rivest, Shamir, and Adleman public key encryption technology)). For example, the alleged RC4 is used in SSL (secure socket layer) which is implemented in many Internet-based communications (e.g., through HTTP (hyper-text transfer protocol) and FTP (file transfer protocol)).

The alleged RC4, however, can require eight to sixteen machine cycles to output a single byte. While this can be run in software, it requires a substantial amount of hardware resources. Also, implementing the alleged RC4 in hardware limits the flexibility of running the alleged RC4 on different computing devices (i.e., because it would require the presence of alleged RC4-specific hardware in each device).

Another method used for securing data is a hash function. A hash function transforms an input string into a fixed-size output string (also known as a "hash value"). The size of the output string is referred to as a message "digest." It is generally desirable to provide a hash function that is one-way (i.e., hard to invert) and collision-free (i.e., different hash values are generated for different messages). One standard hash function is SHA-1 (secure hash algorithm as revised in 1994) which generates a 160-bit digest from an input stream of less than 264 bits.

Cryptographic primitives such as stream ciphers and secure hash functions are an essential part of many cryptosystems, making their efficient computation an important problem. Most practical implementations, however, use custom designs (message digests (e.g., MD5 and MD6), SHA-1 or alleged RC4, Seal, and Scream) that depend on empirical analysis, as opposed to formal complexity theoretic or information theoretic analysis.

Accordingly, the current solutions fail to provide an efficient methodology for quick and secure data encryption/decryption, while maintaining sufficient efficiency and/or speed for implementation in software.

SUMMARY

Techniques are disclosed to enable efficient implementation of secure hash functions and/or stream ciphers. More specifically, a family of graphs is described that has relatively large girth, large daw, and/or rapid mixing properties. The graphs are suitable for construction of cryptographic primitives such as collision resistant hash functions and stream ciphers, which allow efficient software implementation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The following discussion assumes that the reader is familiar with cryptography techniques. For a basic introduction of cryptography, the reader is directed to a text written by A. Menezes, R van Oorschot, and S. Vanstone entitled, "Handbook of Applied Cryptography," fifth printing (August 2001), published by CRC Press.

Overview

The following disclosure describes a class of graphs that may be employed in software to implement secure hash functions and/or stream ciphers. More specifically, a collection of matrices are described that can be used in the construction of graphs suitable for provision of cryptographic primitives. The speed of the methodologies described here may be further improved by utilizing hardware such as an application specific integrated circuit (ASIC). Also, each stage discussed with reference to methodologies herein may be performed by software, hardware, firmware, or combinations thereof.

Secure Hash Function

Figure 1:
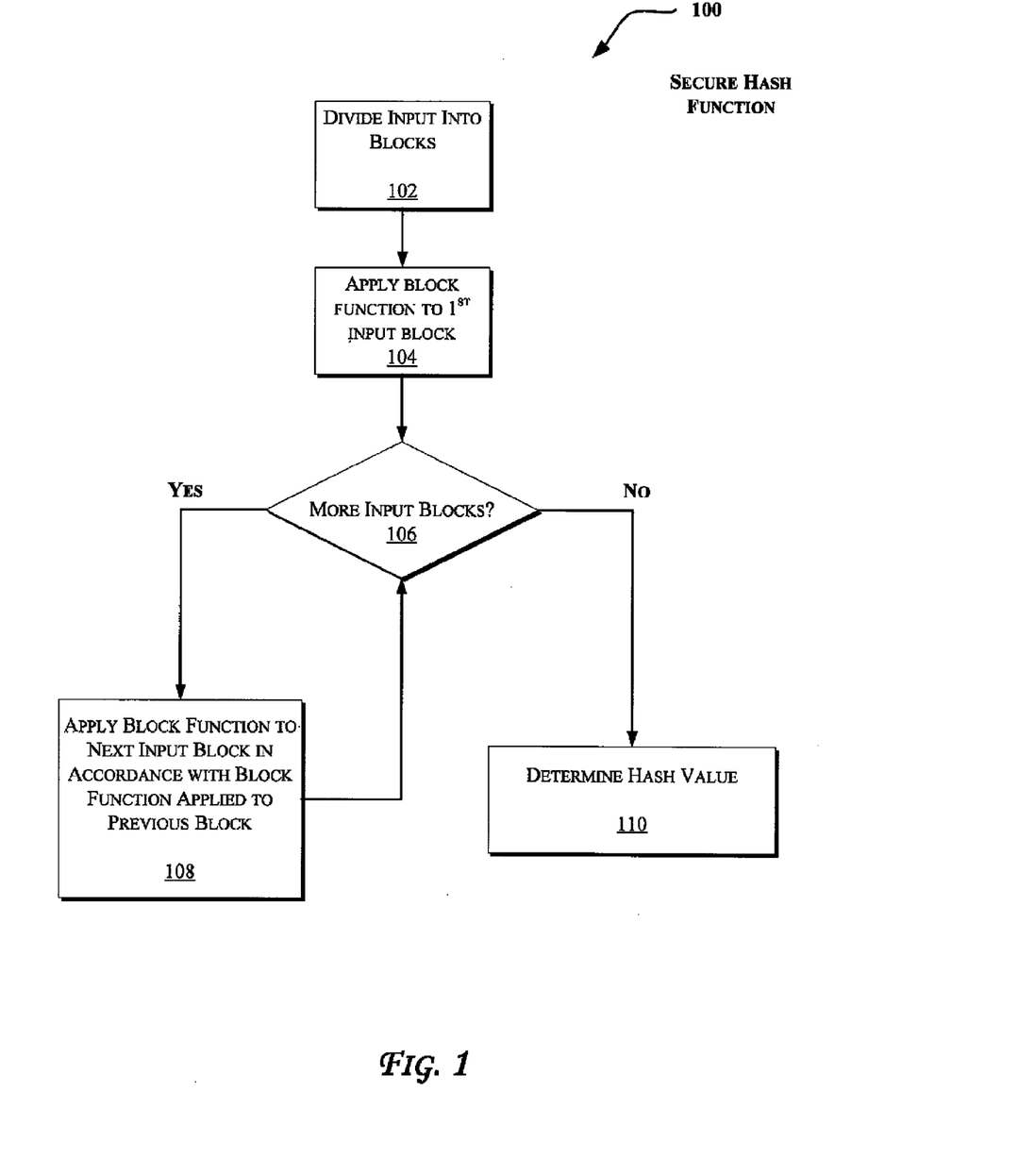
FIG. 1 illustrates an exemplary secure hash function method.

FIG. 1 illustrates an exemplary secure hash function method 100. The method 100 starts with a stage 102 which divides an input string into blocks of fixed length (as will be further discussed herein, for example, with respect to FIGS. 2 and 4). A block function is then applied to the first input block (104). The block function will be further discussed below under the same title. If more input blocks remain for processing (106), the block function is applied to a next input block in accordance with select properties of the block function applied to the previous block (as discussed below, for example, with reference to matrix graphs). In one implementation, the advanced encryption standard (AES) may be used as the inter-block function (as will be further discussed with reference to FIG. 4). If all input blocks have been processed, the hash value of the input is determined based on the result provided by the block function applied to the last input block (110).

Accordingly, instead of a simplified approach that may add the hash values of each input block yielding an implementation prone to security risks (e.g., because changing the order of input blocks will still result in the same final hash value), the method 100 ensures a more secure implementation by generating a final hash value recursively based on previously calculated hash values. Other implementations will be further discussed herein that utilize graphical and matrix-based methodologies to provide a final hash value.

Graph-Based Hash Compression Function

Figure 2:
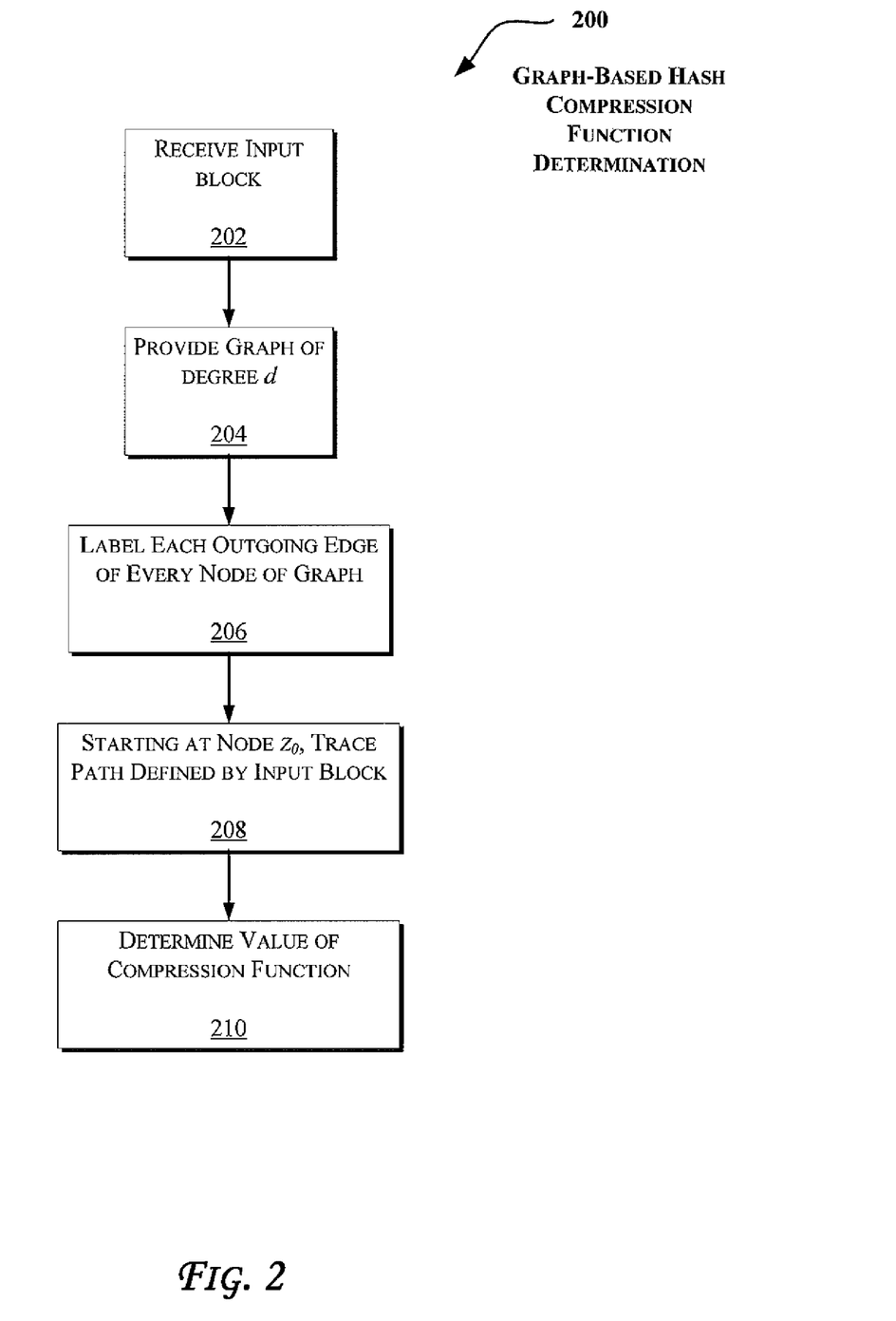
FIG. 2 illustrates an exemplary graph-based method for determining a hash compression function to implement a secure hash function.

FIG. 2 illustrates an exemplary graph-based method 200 for determining a hash compression function to implement a secure hash function. The method 200 may be applied to an input block of fixed size (e.g., by dividing the original input string into blocks). In a stage 202, an input block ($x_1, \ldots, x_t$, where each $x_i \in \{1, \ldots, d\}$) is received. A regular graph of degree d is provided (204) and each outgoing edge of every node of the graph is labeled, for example, with an integer having a value less than or equal to d (206). The node label may be used to navigate or trace the graph for encryption/decryption purposes.

A hash function may be constructed by starting at a node $z_0$ and tracing a path which is described by the sequence $x_1, \ldots, x_d$ (208). The final point of the trace indicates the value of the compression function (210).

In an implementation, the compression function determination requires two properties:

(1) the directed parallel girth of the graph is large in comparison to the input block length so that parallel directed paths between any two nodes do not exist; and (2) the average directed claw length is large enough so that starting from two random nodes one can find a common node reachable by a path of length t only with negligible properties.

Various types of intersecting paths may be considered for the graph girth. For example, a directed parallel cycle may include two directed paths starting at a same node and ending at a same node. A directed claw may be considered when the start nodes are different with a same end node. And, a directed cycle would start and end at a same node.

Property (1) is important so that one does not find collisions on the first block. If a randomizing function (such as a block cipher done by the data encryption standard (DES), MD5, and the like) is applied at the end of the first block, then on two different inputs property (2) avoids a collision in the next block and so on. Specific groups of matrices will be introduced under the section entitled "matrix graphs" below that will possess these properties. Moreover, the matrices are carefully chosen to contain small entries and admit efficient implementation (e.g., when implemented in software).

Matrix Graphs and Block Functions

In one implementation, the block function is based on a walk on a Cayley graph (referred to herein as a "matrix graph") defined by the matrices. Let some $m = 2^l$ (e.g., $m = 2^{32}$), where m is the number of nodes in the matrix graph. Let $A = \{\sigma_1, \ldots, \sigma_k\}$ be a set of generators (such as those shown in FIG. 3 and further discussed below), with $\sigma_i \in \square_m^{r \times r}$ for some r, that is, a r×r matrix over integers modulo m. In certain examples herein, the constructions shown use r=3. Let the graph $G = G_A$ with vertex set $V = \square_m^{r \times r}$ and edges $\{(M,N) | N = \sigma_i, \sigma_i \in A\}$. Note G is a directed graph.

Given such a graph (G), the block function B may be defined as follows. Let $\Sigma$ be an alphabet of size k (the number of generators of G). Then B will map $V \times \Sigma^n \rightarrow V$, so that given an initial location M and input $X = x_1, \ldots, x_t$ with each $x_i$ a character over $\Sigma$, we have that B(M,X) is a matrix in V. By taking any correspondence between $\Sigma$ and A, each $x_i$ may be viewed as a matrix $B_i \in A$. We can now define:

$$B(M, X) \square M \cdot \prod_{i=1}^{n} B_i$$

As discussed above with respect to properties (1) and (2), the desired characteristics of the block function may be summarized as:

1. If M is any vertex M of G and N any neighborhood of M with radius t or less, then N is a tree; and
2. If $M_1$ and $M_2$ are vertices in a graph, $M_1$ and $M_2$ form a d-claw if there are paths $p_1$ and $p_2$ of length d and a vertex N with $M_1 \rightarrow_{p_1} N$ and $M_2 \rightarrow_{p_2} N$. Then, B should have the property that the probability that uniformly chosen $M_1$ and $M_2$ form an n-claw is negligible.

Let g be a random one-way function mapping some domain D to D, with a bijection $\phi: D \rightarrow V$. Let I be the identity matrix in V. Let the input be $X_1, \ldots, X_b$ with each $X_i \in \Sigma^t$ as above. We assume that the input is an integral number of blocks; padding issues for inputs of different sizes can be dealt with using standard methods. Define $Y_0 = I$ and for $1 \leq i \leq b_1$, $Y_i = \phi(g(\phi^{-1}(B(Y_{i-1}, X_i))))$. We may define the hash function as $H(X_1, \ldots, X_b) = Y_b$.

In one implementation, if such a bijection $\phi$ is difficult to find, a relaxed bijection $\psi$ can be used instead. More specifically, let $f(X_i)$ be a secure hash evaluated at $X_i$ that outputs w bits, which are interpreted by any convenient technique as numbers $a_1$, $a_2$, and $a_3$ and defining $Y_i \psi(X_i)$ by:

$$\psi(X_i) = \begin{pmatrix} 1 & a_1 & a_2 \\ 0 & 1 & a_2 \\ 0 & 0 & 1 \end{pmatrix}.$$

Accordingly, it can be seen that given two inputs X and X', if they collide on an interblock step, the girth arguments show that if they differ on the following block, the outputs at the end of that block will differ also.

If d is chosen sufficiently small, property (2) can be shown for all graphs. In particular, let n be the number of nodes in a graph, and let $d = (\log n)/(2+\epsilon)$. Let B(u) be the number of nodes within distance d of a node u; then $|B(u)| \in o(\sqrt{n})$. Now if a node v is chosen at random, we have as well $|B(v)| \in o(\sqrt{n})$.

Accordingly, the probability that u and v form a claw (e.g., reaching a same node) is bounded by $|B(u) \cap B(v)|/\cap n \in o(1)$. Thus, if d is logarithmic in the number of nodes in the graph, the probability of picking a claw is negligible.

Figure 3:
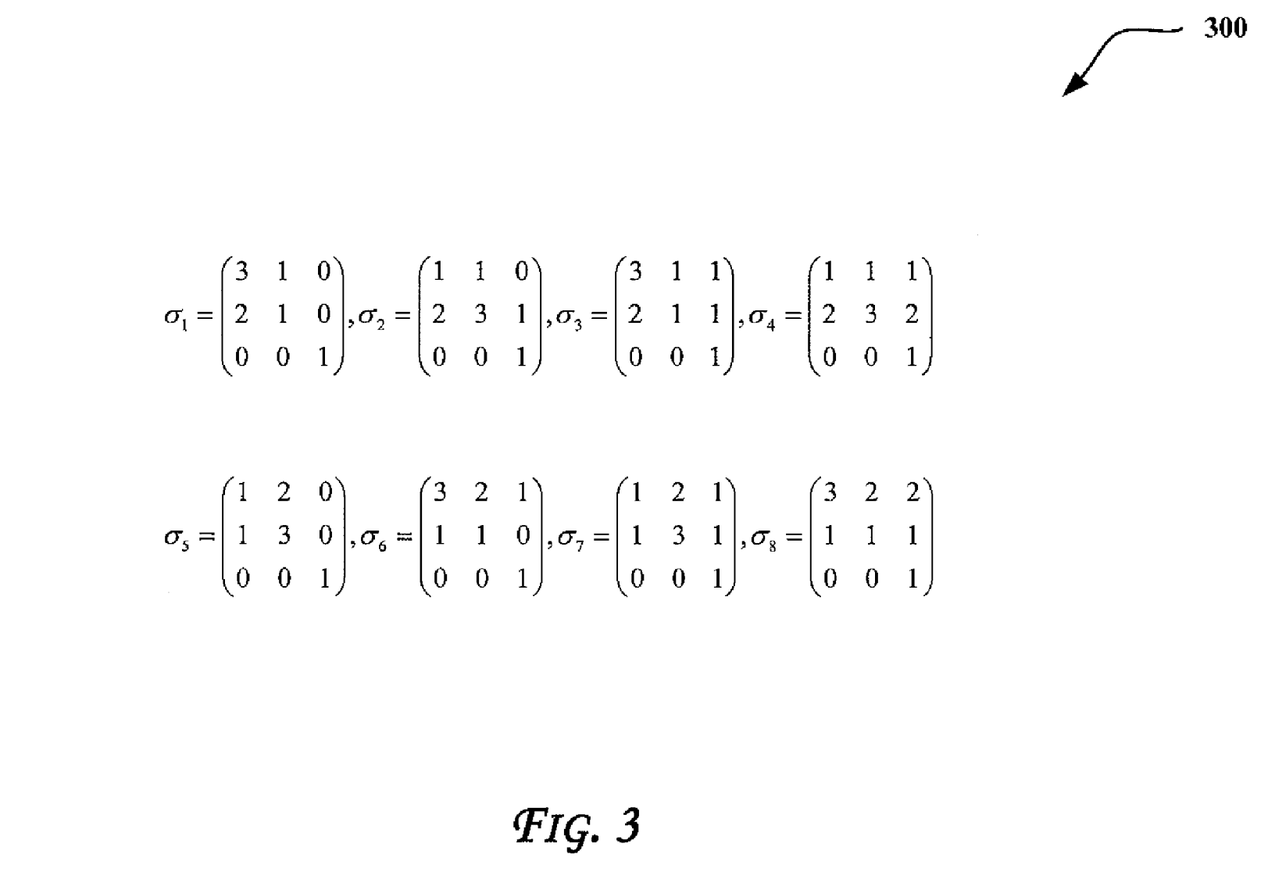
FIG. 3 illustrates an exemplary set of matrices which may utilized as primitives for fast secure hash functions and stream ciphers.

FIG. 3 illustrates an exemplary set of matrices (300) which may utilized as primitives for fast secure hash functions and stream ciphers. In one implementation, experimentation has shown that the graph derived from the matrices shown in FIG. 3 has better eigenvalue separation than Ramanujan graphs for graphs of size up to a million: $\lambda_2=0.63$ for Ramanujan as opposed to $\lambda_2=0.57$ for the present graph.

Hash Implementation

Figure 4:
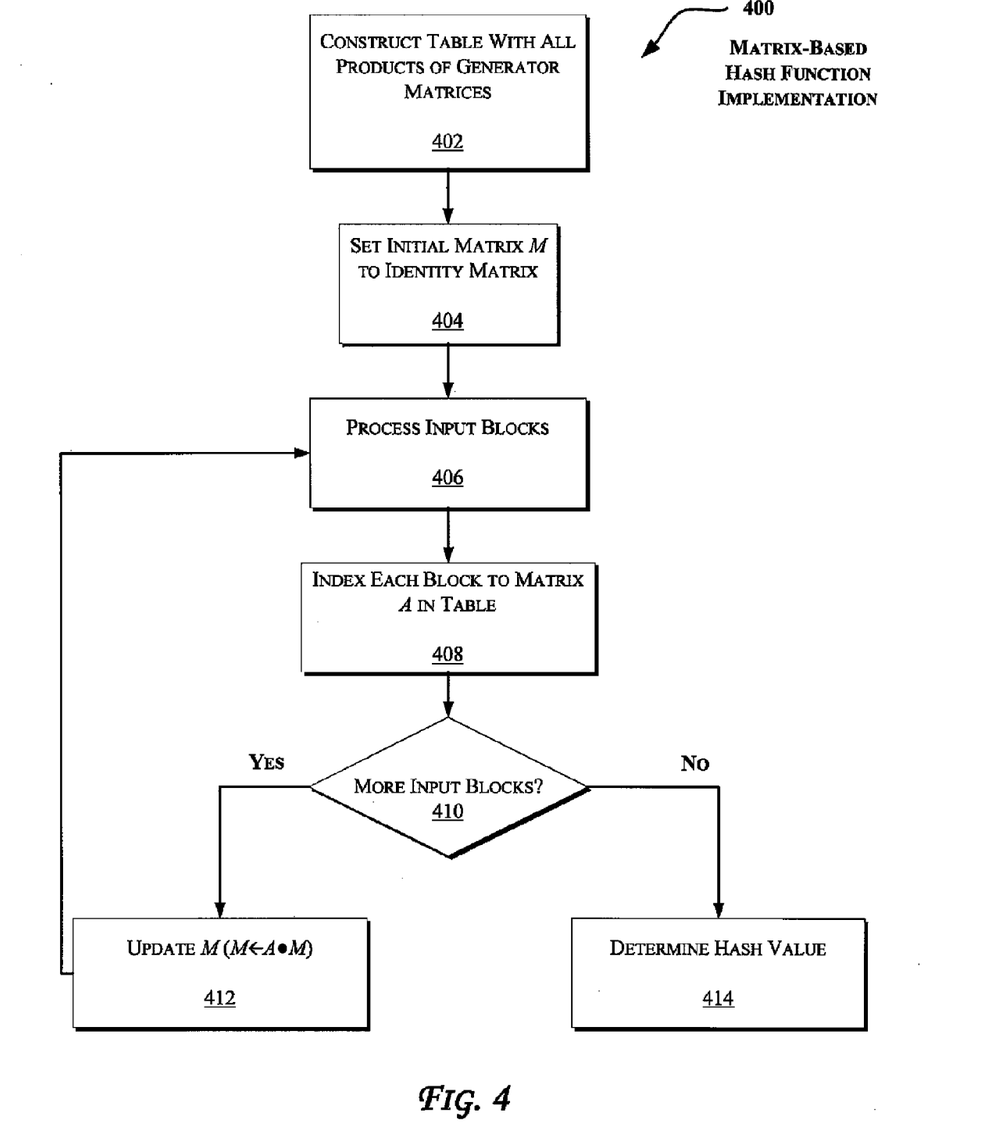
FIG. 4 illustrates an exemplary matrix-based method for implementing the hash function.

FIG. 4 illustrates an exemplary matrix-based method 400 for implementing the hash function. To implement the hash function, a table of entries including all possible products of the generator matrices is constructed (402). For example, a table with 512 entries is constructed for all possible length three products of the generator matrices discussed with reference to FIG. 3. The number of nodes (m) may be set to $2^{32}$ (e.g., a natural size of integers on current systems as will be further discussed with reference to FIG. 6). In one implementation, this implies that t of 16 can be used. Furthermore, AES may be used as the inter-block function g.

In a stage 404, the initial matrix M is set to be the identity matrix (such as discussed with reference to the matrix I in the vertex set V). A stage 406 processes the data input blocks (e.g., as 9-bit blocks in the example discussed with reference to FIG. 3). Each block is used to index a matrix A in the table (408). As long as more input blocks remain for processing (410), a stage 412 updates M (M←A·M). Once all input blocks are processed (410), a stage 414 determines the final hash value (such as discussed with reference to stage 110 of FIG. 1).

Accordingly, instead of a simplified approach that may add the hash values of each input block yielding an implementation prone to security risks (e.g., because changing the order of input blocks will still result in the same final hash value), the method 400 ensures a more secure implementation by multiplying the hash values of each input block by a set of generator matrices (such as those discussed with reference to FIG. 3). Also, even though the methods 200 of FIG. 2 and 400 of FIG. 4 are based on graphs and matrices, respectively, it is envisioned that graphs may be readily represented by matrices and vice versa.

In one implementation, using a table of 256 entries based on a set of four generator matrices is not as efficient as the example discussed with reference to FIG. 4. In spite of the unnatural block size (in light of byte-size computing prevalent), the 9-bit implementation provides more speed (31 MB/s for the 9-bit block size versus 27 MB/s for the 8-bit block size). This is true, in part, because fewer matrix multiplications need to be performed.

Stream Cipher Amplification

The matrix graphs discussed herein also have expansion properties that make them suitable for constructing stream ciphers. For example, the alleged RC4 can be thought of as a random walk on a graph with a set of permutations on $\{1, \ldots, 256\}$. The matrix graphs have the additional property that their directed girth is relatively large. So, a random walk can not return to a given node in a relatively short amount of time. An immediate way to use this graph is to stretch the outputs of the alleged RC4, by using the alleged RC4's output as a way to perform a random walk on the graph. For example, after being initialized with a key k which sets the internal state, the stream cipher outputs a sequence of bytes, $x_1$, $x_2$, . . . . Each $x_i$ output is a function of the current internal state of the cipher, which is changed with each output. In an implementation, the output of this stream cipher is free of the correlations that have been found in the alleged RC4.

Figure 5:
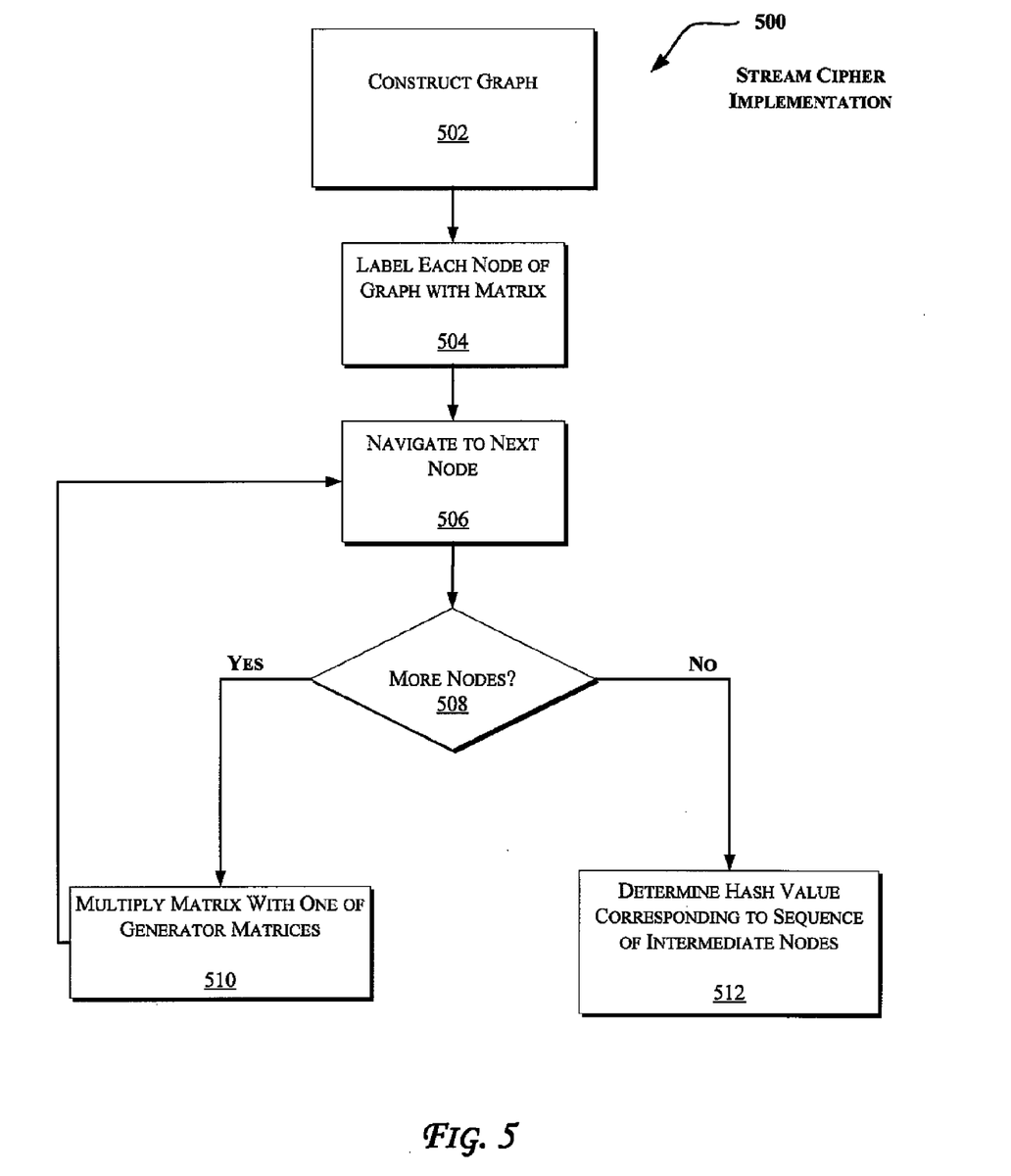
FIG. 5 illustrates an exemplary method for implementing the stream cipher by utilizing the matrix graphs discussed herein.

FIG. 5 illustrates an exemplary method 500 for implementing the stream cipher by utilizing the matrix graphs discussed herein. After constructing a graph (502), each node of the graph may be labeled by a matrix (504). The number of nodes may vary depending on the implementation. A stage 506 facilitates navigation to a next node. As long as there remain other nodes to navigate to (508), each matrix associated with a node is multiplied by a generator matrix (510) such as those discussed with reference to FIG. 3. Once no more nodes remain (508), a hash value corresponding to the sequence of intermediate nodes is determined (512). The hash value may be determined such as discussed with reference to the previous figures (e.g., FIGS. 2 and 4).

As discussed with reference to the block functions, by a suitable choice of generators A, each $x_i$ output may be associated by the block cipher with a matrix $B(x_i)$, and form a walk on the matrix graph generated by A. For a matrix $$B = \begin{pmatrix} a & b & c \\ d & e & f \\ 0 & 0 & 1 \end{pmatrix},$$

let L(B)=(top(c),top(f)) be the label output for each matrix at each step in the random walk. The empirical expansion properties enjoyed by G(A) indicate that the sequence $L(B(x_1))$, $L(B(x_2))$, . . . should be a pseudorandom sequence, if the $x_i$ are.

A remaining portion of this description (immediately following this section) deals with proof that the generator matrices used herein (such as those discussed with reference to FIG. 3) possess the discussed properties. Furthermore, methodologies for generating other generator matrices (e.g., of different size) are described which could be used in the implementations discussed herein (e.g., in place of the matrices illustrated in FIG. 3). Accordingly, a class of monoids will be described that can be used to construct graphs with provable girth properties. These monoids may be used as a primitive for secure hashes and stream ciphers.

Free Monoids

The monoid M generated by the matrices S and T below is free, that is, isomorphic to the monoid of binary strings.

$$S = \begin{pmatrix} 1 & 0 \\ 1 & 1 \end{pmatrix}, \text{ and } T = \begin{pmatrix} 1 & 1 \\ 0 & 1 \end{pmatrix}$$

One way to prove this is to show that given A∈M, only one of A'·S=A or A'·T=A holds with A' ∈ M. In fact, the maximum component of A' is shown to be strictly less than that of A, so that an easy induction accomplishes the proof.

Thus, an easy way to show that a monoid M generated by some set G of matrices is free, is to show that for any A∈M, there is a unique U A∈G with A'·U=A, where A' ∈ M and smaller in some sense than A.

Considering the finite monoid generated by S and T (where operations are reduced modulo $m=2^t$), the matrix graph so defined has relatively high girth.

Lemma. The matrix graph generated by S and T with operations modulo $m=2^t$ has girth l–1.

Proof. As the graph is a Cayley graph, it suffices to show that the identity I is not involved in a short cycle. Consider a matrix A on a path from the identity, and let $a_{max}$ be the maximum coefficient in A. If $a_{max} < m/2$, then the maximum coefficient of either AS or AT is at most $2a_{max}$. Hence, if A is arrived at from a path of length t from I, and A' is the matrix in the infinite monoid over $\square$, if $t<l$, then $a_{max}<m$, and A=A' component-wise. In particular, as the infinite is free, A≠I. Thus I is not involved in a cycle of length less than l, proving the lemma.

Accordingly, this shows that it may generally be enough to find free monoids in one implementation. Moreover, the construction of the free monoid above suggests that to show that a monoid M generated by some set G of matrices is free, one should show that for any A∈M, there is a unique U A∈G with A'·U=A, where A' ∈ M and smaller in some sense than A.

A Free Monoid

For a simple construction, let $G_1 = \{T_1, \ldots, T_4\}$ and $M_1$ be the monoid generated by $G_1$, with:

$$\tau_1 = \begin{pmatrix} 1 & 0 & 0 \\ 2 & 1 & 0 \\ 0 & 0 & 1 \end{pmatrix}, \tau_2 = \begin{pmatrix} 1 & 1 & 1 \\ 1 & 1 & 1 \\ 0 & 0 & 1 \end{pmatrix}, \tau_3 = \begin{pmatrix} 2 & 1 & 1 \\ 1 & 1 & 1 \\ 0 & 0 & 1 \end{pmatrix}, \tau_4 = \begin{pmatrix} 2 & 1 & 0 \\ 0 & 1 & 0 \\ 0 & 0 & 1 \end{pmatrix}$$

Note that if $\sigma_i$, for i=1 ... 4, are the nontrivial degree-5 Gabber-Galil generators, then:

$$T_1 = \sigma_2, T_2 = \sigma_1\sigma_4, T_3 = \sigma_3\sigma_2, T_4 = \sigma_3^2$$

Lemma. The monoid $M_1$ is free.

Proof. Given a matrix A, let A' be the upper-left 2×2 submatrix of A. We note that $\sigma_i^0$ is either S for i=1,2 and T for s=3,4. Also, as the first two columns of the last row of any element of $G_1$ are zero, if $A = \Pi U_i$ for some $U_i \in G_1$, then $A^\circ = \Pi U_i^\circ$. Thus, given any $A \in M_1$, we have that $A^\circ$ is equivalent to a string $s_A$ over $\{S,T\}$, by the free-ness of the 2×2 monoid. Examining the generators, one can see that:

$$\tau_1^0 = S \cdot S, \tau_2^0 = S \cdot T, \tau_3^0 = T \cdot S, \tau_4^0 = T \cdot T$$

Hence, given the last two characters of $s_A$, one can see that there is a unique $T_i$ such that $A' \cdot T_i = A$, with $A' \in M_1$. Furthermore, as $|s'_A| = |s_A| - 2$, there is a norm on $M_1$ that has been reduced, and so one can induct that $M_1$ is indeed free.

General 3×3 Monoids

Any element of $SL_2(\square^+)$ can be identified with a binary string by forming the unique product equaling that element. The monoid of the previous section is then constructed from a set of $SL_2(\square^+)$ matrices whose strings are suffix-free. The entries in the third column are in this sense spurious. At the very least, aesthetic considerations may compel discovering matrices where all columns are involved in forming unique products.

A general class of free monoids are illustrate, of which the matrices of FIG. 3 are an example.

Definition. Let the components of a matrix be:

$$\begin{pmatrix} a & b & c \\ d & e & f \\ 0 & 0 & 1 \end{pmatrix}$$

A matrix is called feasible if the following holds:

$a+b>c$, and $d+e>f$

Lemma. Any product of feasible generators has the sum of the first two columns strictly greater than the third, for the upper two components.

Proof. The proof is by induction on the length of the product. The base case is clear by the definition of feasible. Now suppose:

$$M = \begin{pmatrix} A & B & C \\ D & E & F \\ 0 & 0 & 1 \end{pmatrix}$$

Assume that the sum of the first two columns is strictly greater than the sum of the third. Then, if one takes a step by a feasible generator, the first row is $[A_a + B_d, Ab + B_e, A_c + B_f + C]$. Summing the first two entries results in:

$$A(a+b) + B(d+e) \geq Ac + Bf + A + B > Ac + Bf + C$$

Based on the property assumed of the generator matrix, the extra A and B result from the inequalities (and the strict inequality from the assumption that at least one of the generator inequalities is strict). Finally, the assumption on M gives $A+B>C$, proving the lemma.

Next, a general construction of generators whose monoid is free is described. Note this is one of many obvious ways to generalize the construction. A set of matrices $C_1, \ldots, C_k$ is said to be free if the monoid generated by them is free. This is equivalent to their expressions as products of $SL_2(\square^+)$ being prefix-free.

Lemma. Let $C_1, \ldots, C_k$ be any free matrices in $SL_2(\square^+)$. Fix a column $c_j$ of $C_j$, and let $g_j^{(i)}$ for i=1,2 be elements of $SL_3(\square^+)$ defined from $C_j$ by:

$$\begin{pmatrix} & & u_j^{(1)} \\ C_j & & v_j^{(1)} \\ & & 1 \end{pmatrix}$$

where the $u_j^{(i)}$ and $v_j^{(i)}$ are any integers satisfying:

$$\begin{pmatrix} u_j^{(1)} \\ v_j^{(1)} \end{pmatrix} < c_j < \begin{pmatrix} u_j^{(2)} \\ v_j^{(2)} \end{pmatrix},$$

as well as the conditions of previous Lemma. Then, the monoid generated by $G = \{g_j^{(i)}\}$, with $j=1, \ldots, k$ and $i=1,2$, is free.

Proof. Let M be the monoid generated by the G of the lemma. The same technique as before may be used, namely, given any X∈M, it can be shown that either X∈G, or there is a unique T∈M with $X'_j = X$ for some X' ∈M. Given X∈ (M/G), as before one can see that $$X^0 = \prod_j C_{i_j},$$

for some $i_1, \ldots i_j$, so a j can be found so that either $X = X' g_j^{(1)}$ or $X = X' g_j^{(2)}$. The question now is to disambiguate between these two choices. Let $x_j$ be the column vector of the first two coordinates of the column of X corresponding to $c_j$ (i.e., the first or second column, depending on what was used to choose the third column of $g_j^{(i)}$. Similarly, let $x_3$ be the first two coordinates of the third column of X. Let $u_i = u_j^{(i)}$ and $v_i = v_j^{(i)}$. The disambiguation is performed by picking $g_j^{(i)}$ iff $x_j \geq x_3$. To show this works, suppose that $X = X' g_j^{(2)}$ but $x_j \geq x_3$. If j=1:

$$X' = \begin{pmatrix} a & b & c \\ d & e & f \\ & & 1 \end{pmatrix} \text{ and } C_j = \begin{pmatrix} w & x \\ y & z \end{pmatrix},$$

then $x_j \geq x_3$ implies:

$$\begin{pmatrix} wa+yb \\ wd+ye \end{pmatrix} \geq \begin{pmatrix} u_2 a + v_2 b + c \\ u_2 d + v_2 e + f \end{pmatrix} \geq \begin{pmatrix} wa+yb+c \\ wd+ye+f \end{pmatrix},$$

as $u_2 > w$ and $v_2 > y$. But the first and final inequalities are impossible, as all numbers are $\geq 0$. For the other direction, assume that $X = X' g_j^{(1)}$ but $x_j$ is not greater than or equal to $x_3$. Then, either $$wa+yb < u_1 a + v_1 b + c \leq wa+yb+c-a-b,$$

or $wd+ye < u_1 d + v_1 e + f \leq wd+ye+f-d-e,$ by the choice of $u_1$ and $v_1$. But this implies either $a+b \leq c$ or $d+e \leq f$, and as the $g_k^{(i)}$ are feasible generators, neither situation is possible by the previous Lemma. The case when $j=2$ is analogous.

Accordingly, the vectors $\{u^{(i)}, v^{(i)}\}_{i=1,2}$ are a disambiguating pair with respect to a matrix $C \in SL_2(\Box^+)$ if they satisfy the conditions of the lemma above.

Remark Accordingly, this construction can be easily extended to generators of larger dimension.

Hardware Implementation

Figure 6:
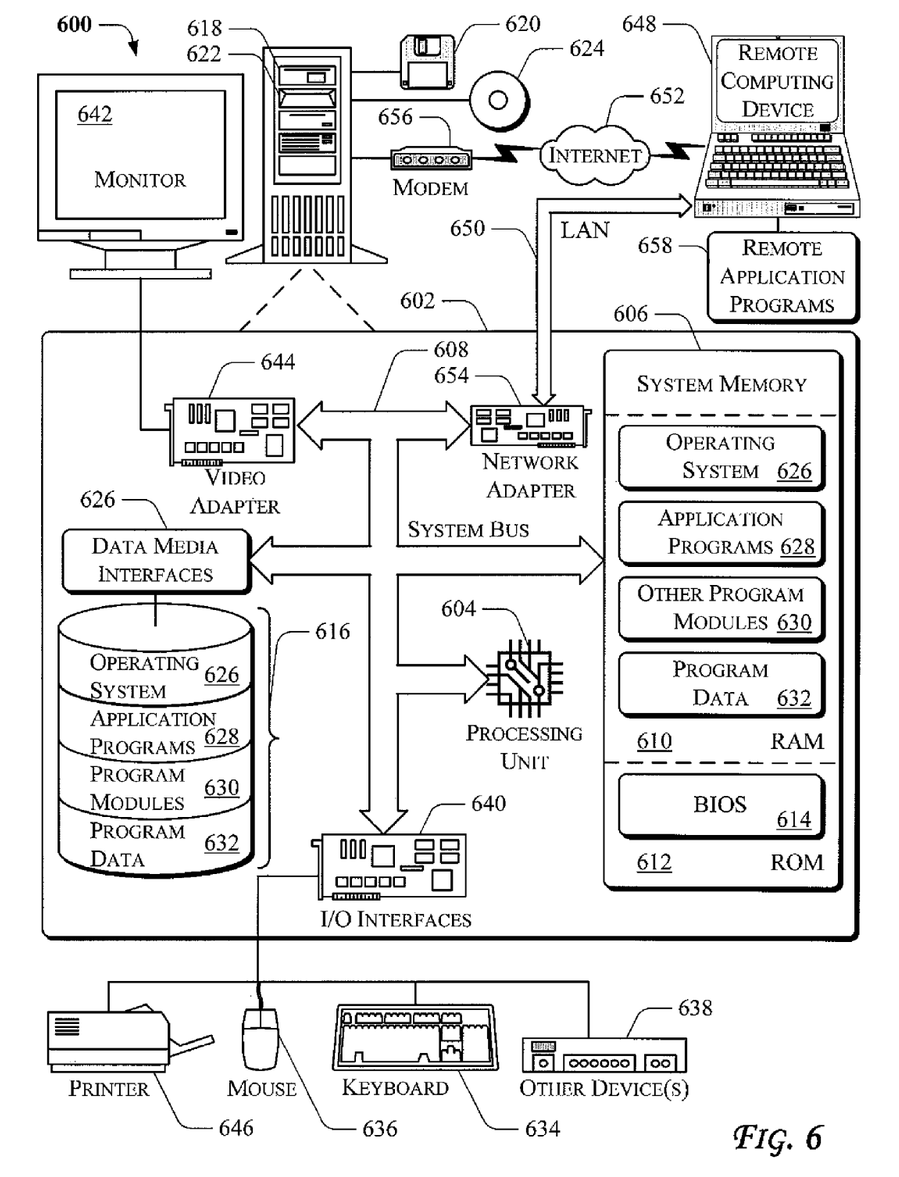
FIG. 6 illustrates a general computer environment, which can be used to implement the techniques described herein with respect to provision of secure hash functions and/or stream ciphers.

FIG. 6 illustrates a general computer environment 600, which can be used to implement the techniques described herein with respect to provision of secure hash functions and/or stream ciphers. The computer environment 600 is only one example of a computing environment and is not intended to suggest any limitation as to the scope of use or functionality of the computer and network architectures. Neither should the computer environment 600 be interpreted as having any dependency or requirement relating to any one or combination of components illustrated in the exemplary computer environment 600.

Computer environment 600 includes a general-purpose computing device in the form of a computer 602. The components of computer 602 can include, but are not limited to, one or more processors or processing units 604 (optionally including a cryptographic processor or co-processor), a system memory 606, and a system bus 608 that couples various system components including the processor 604 to the system memory 606.

The system bus 608 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer-readable media. Such media can be any available media that is accessible by computer 602 and includes both volatile and non-volatile media, removable and non-removable media.

The system memory 606 includes computer-readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by one or more interfaces (not shown).

The disk drives and their associated computer-readable media provide non-volatile storage of computer-readable instructions, data structures, program modules, and other data for computer 602. Although the example illustrates a hard disk 616, a removable magnetic disk 620, and a removable optical disk 624, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may implement all or part of the resident components that support the distributed file system. Example of program modules and data is discussed below with reference to FIG. 6.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to the processing unit 604 via input/output interfaces 640 that are coupled to the system bus 608, but may be connected by other interface and bus structures, such as a parallel port, game port, or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computer 602 via the input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, game console, and the like. The remote computing device 648 is illustrated as a portable computer that can include many or all of the elements and features described herein relative to computer 602.

Logical connections between computer 602 and the remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, the computer 602 is connected to a local network 650 via a network interface or adapter 654. When implemented in a WAN networking environment, the computer 602 typically includes a modem 656 or other means for establishing communications over the wide network 652. The modem 656, which can be internal or external to computer 602, can be connected to the system bus 608 via the input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to the computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of the computing device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may include "computer storage media" and "communications media."

"Computer storage media" includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically includes computer-readable instructions, data structures, program modules, or other data in a modulated data signal, such as carrier wave or other transport mechanism Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

We claim:

1. A method for providing a hash function performed by a computer system executing computer instructions stored on a computer storage media, the method comprising:
    constructing a table of entries via the computer, wherein the table comprises entries for all possible products of a plurality of generator matrices;
    setting, via the computer, an initial matrix to an identity matrix;
    processing, via the computer, input data as one or more blocks of fixed length;
    indexing, via the computer, each block to the generator matrix represented in the table; and
    updating, via the computer, the initial matrix.

2. A method as recited in claim 1, wherein the method further comprises, upon indexing being completed for each of the one or more blocks of fixed length, determining a hash value of the input data based on a result provided by the processing and indexing applied to a last block indexed, wherein the determining is utilized to provide a secure hash function.

3. A method as recited in claim 2, wherein the hash value is determined based on the result provided by the processing and indexing of the one or more blocks of fixed length.

4. A method as recited in claim 1, wherein advanced encryption standard (AES) is utilized to provide an inter-block function for the one or more blocks of fixed length.

5. A method as recited in claim 1, wherein the updating is performed by multiplying the initial matrix by the index matrix.

6. A method as recited in claim 1, wherein the generator matrix is a free monoid.

7. A method as recited in claim 1, wherein the generator matrix is a feasible 3×3 monoid.

8. A method as recited in claim 1, wherein the updating occurs for each block of the one or more blocks of fixed length indexed to the generator matrix.

9. A method as recited in claim 1, further comprising processing a next input block of the one or more blocks of fixed length responsive to the updating.

10. A computer-readable storage medium excluding signals, wherein the computer-readable storage medium has computer executable instructions encoded thereon that upon execution configure a computer to perform operations comprising:
    obtaining a plurality of generator matrices;
    constructing a table of entries, wherein the entries include entries for each possible product of the plurality of generator matrices;
    setting an initial matrix to an identity matrix;
    cryptographically processing input as one or more blocks of fixed length;
    mapping each block to the entries in the table of entries representing the generator matrices; and
    updating the initial matrix.

11. A computer-readable storage medium as recited in claim 10, wherein the operations further comprise, upon mapping being completed for each of the one or more blocks of fixed length, determining a hash value of the input based on a result provided by the cryptographically processing and mapping applied to a last block mapped to provide a secure hash function.

12. A computer-readable storage medium as recited in claim 10, wherein advanced encryption standard (AES) provides an inter-block function for the one or more blocks of fixed length.

13. A computer-readable storage medium as recited in claim 10, wherein the updating is performed by multiplying the initial matrix by a matrix of the mapped blocks.

14. A computing device comprising:

a memory storing a program module;

a processor operably coupled to the memory to execute the program module to:

construct a table of products, wherein the table of products includes entries for each possible product of a plurality of predetermined generator matrices;

select an identity matrix as an initial matrix;

process input data as one or more blocks of fixed length;

index each block to the products of the predetermined generator matrix matrices as represented in the table of products; and     update the initial matrix.

15. A computing device as recited in claim 14, wherein upon indexing being completed for each of the one or more blocks of fixed length, a hash value of the input data is determined based at least on a result provided by the processing and indexing applied to a last block indexed to provide a secure hash function.

16. A computing device as recited in claim 14, wherein advanced encryption standard (AES) provides an inter-block function for the one or more blocks of fixed length.

17. A computing device as recited in claim 14, wherein updating is performed by multiplying the initial matrix by the identity matrix.

* * * * *